US006883616B2

(12) United States Patent
Templeton (10) Patent No.: US 6,883,616 B2
(45) Date of Patent: Apr. 26, 2005

(54) WALK-BEHIND LANDSCAPE EDGER/TRENCHER (75) Inventor: David J. Templeton, New Holland, PA (US)

(73) Assignee: Turf Teq, LLC, New Holland, PA (US)

( * ) Notice: Subject to any disclaimer, the term of this patent is extended or adjusted under 35 U.S.C. 154(b) by 41 days.

(21) Appl. No.: 10/458,420

(22) Filed: Jun. 10, 2003

(65) Prior Publication Data

US 2004/0251037 A1  Dec. 16, 2004

(51) Int. Cl.[7] .................................. A01B 33/16
(52) U.S. Cl. ...................... 172/42; 172/13; 172/425; 475/184
(58) Field of Search ................. 172/42, 13, 15–18, 172/110, 111, 425; 475/183–185

(56) References Cited

U.S. PATENT DOCUMENTS

| 3,593,802 A | * | 7/1971 | De Lange, Jr. ............... 172/15 |
| 3,908,292 A | * | 9/1975 | Harris ....................... 37/142.5 |
| 4,002,205 A | * | 1/1977 | Falk .......................... 172/15 |
| 4,344,374 A | * | 8/1982 | Gangluff et al. ............ 111/109 |
| 4,429,477 A | * | 2/1984 | Tice et al. .................... 37/363 |
| 4,463,544 A | * | 8/1984 | Carsello et al. ............. 56/17.1 |
| 4,645,011 A | * | 2/1987 | Feikema et al. ............. 172/15 |
| 4,930,296 A | * | 6/1990 | Takei et al. .................. 56/11.3 |
| 5,101,685 A | * | 4/1992 | Beck .......................... 74/650 |
| 5,174,686 A | * | 12/1992 | Raymond .................. 405/184 |
| 5,212,896 A | * | 5/1993 | Hillard et al. ................ 37/355 |
| 5,226,248 A | * | 7/1993 | Pollard ......................... 37/94 |
| 5,503,250 A | * | 4/1996 | Schantz et al. .......... 188/1.11 E |
| 5,915,492 A | * | 6/1999 | Yates et al. .................. 180/197 |
| 6,125,943 A | | 10/2000 | Valois ......................... 172/15 |
| 6,135,220 A | * | 10/2000 | Gleasman et al. ........... 180/9.1 |
| 6,266,900 B1 | | 7/2001 | Bizzell ......................... 37/358 |
| 6,413,181 B1 | * | 7/2002 | Okada .......................... 475/83 |
| 6,449,882 B1 | * | 9/2002 | Kono et al. .................. 37/266 |
| 6,457,267 B1 | * | 10/2002 | Porter et al. ............... 37/142.5 |
| 6,516,545 B1 | * | 2/2003 | Jenkins, Jr. ................. 37/362 |
| 6,651,361 B1 | * | 11/2003 | Porter et al. ................ 37/355 |
| 2003/0201134 A1 | * | 10/2003 | Ishii et al. .................. 180/307 |

* cited by examiner

Primary Examiner—Robert E. Pezzuto
Assistant Examiner—Alexandra K. Pechhold
(74) Attorney, Agent, or Firm—Miller Law Group, PLLC (57) ABSTRACT A walk-behind trenching implement has a side mounted rotary trenching tool for creating a profiled trench into the surface of the earth, which can also be used as an implement to edge landscape beds. The trenching implement is powered by an engine that delivers rotational power in an unbalanced manner to the wheel adjacent to the rotatable trenching tool. The wheel opposite to the trenching tool is can be non-powered to freely rotate as the implement is moved across the surface of the ground, or braked to unbalance power delivery through a differential. This unbalanced propulsion drive induces a skewing action into the operation of the implement that counterbalances the opposite skewing action resulting from the operation of the trenching tool to provide a more smoothly operating implement. A trenching tool having a configuration conducive to profile modification allows flexibility in the desired shape of the trench being formed.

31 Claims, 4 Drawing Sheets

WALK-BEHIND LANDSCAPE EDGER/TRENCHER

BACKGROUND OF THE INVENTION

This invention relates generally to a powered utility apparatus and, more particularly, to a powered trenching apparatus that can operated from behind the implement.

Powered walk behind or self-propelled tools are known in the art. Examples include brush mowers, lawn mowers, rotary brooms, string trimmers and edging mechanisms. Each such implement is operably driven by a dedicated power unit. Motive power is transferred from the power unit to the drive wheels, while other power drive trains transfers operational power to the work apparatus, such as an edging mechanism. Many of these powered walk behind implements have the work apparatus positioned generally centrally and likely forwardly of the engine to provide a balanced load to the operation of the implement. Some such powered implements, like the edging mechanism for example, position the work apparatus to one side of the implement. Edging mechanisms, however, do not encounter a significant load in the operation thereof as the edging device is shaping the edge of landscape beds, and the like.

A trenching mechanism, such as found in U.S. Pat. No. 6,266,900, issued to Dana Bizzell on Jul. 31, 2001, has been in use for many years to dig a trench below the surface of the ground and, therefore, incurs a substantial load during the operation. Typically, a walk behind trencher is operated with the implement trailing the operator, rather than the operator trailing the implement, as with a lawn mower or an edging mechanism. Therefore, the term "walk behind trencher" is somewhat of a misnomer. Pulling a conventional "walk behind trencher" can be an arduous task and is quite tiring to the operator. The power unit must be guided in the proper direction so that the trenching mechanism digs the trench in the desired location, while providing some motive power to the forward movement of the implement.

U.S. Pat. No. 6,125,943, issued to Charles Valois on Oct. 3, 2000, is directed to an edging/trenching mechanism that is of the true walk behind configuration. The work apparatus is configured to provide a narrow slit in the ground and, therefore, does not encountered the high operative loads that a conventional trencher, such as in the aforementioned Bizzell patent. In fact, the more significant the trench being formed by the work apparatus, the greater the side draft loads on the implement would be for a trencher of the Valois configuration. The handling of a side mounted trenching apparatus can be particularly burdensome as the rotation of the trenching tool is normally rotating in the opposite direction to the desired direction of travel of the implement, causing the operator to constantly skew the implement to the side to compensate for the operational load imposed by the trenching tool. Using the "pull behind" version of a side mounted trencher alleviates this problem somewhat, but performance and safety problems compromise the effectiveness and tend to exhaust the operator unduly.

Accordingly, it would be desirable to provide a true walk behind trenching apparatus having a side mounted trenching tool that can be operated in a manner that will enhance performance and ease the physical burden on the operator.

SUMMARY OF THE INVENTION

It is an object of this invention to overcome the disadvantages of the prior art by providing a walk-behind edger/trencher having a side mounted trenching tool that minimizes the side draft loads encountered with the operation of the ground engaging and shaping tool.

It is a feature of this invention that the side mounted trenching tool can be operated into the direction of travel for the implement to provide a more efficient dispersion of the unearthed soil.

It is an advantage of this invention that the operator of the walk behind trenching apparatus will not be burdened physically by the operation of the trenching apparatus.

It is another advantage of this invention that the operator can walk behind the trenching implement to allow the drive mechanism to the implement wheels to power the forward motion of the implement.

It is another object of this invention to provide a drive mechanism for a walk behind trenching apparatus having a side mounted trenching tool that opposes the side draft forces encountered with the operation of the trenching tool.

It is another feature of this invention that the forward motion of the trenching implement will be subjected to minimal course corrections due to the skewing forces imposed by the operation of the trenching tool.

It is still another feature of this invention that the drive mechanism compensates for the side load forces imposed by the operating trenching tool.

It is still another object of this invention to provide a drive mechanism for a walk behind trenching implement having a side mounted trenching tool whereby the operative power is delivered to the drive wheels in an unbalanced manner to offset the skewing action resulting from the engagement of the rotating trenching tool with the ground.

It is yet another feature of this invention that the unbalanced delivery of operative power can be delivered through a differential by restricting the rotation of one of the drive wheels during operation of the edging/trenching implement.

It is yet another advantage of this invention that the restriction of rotation of one of the drive wheels driven through a differential can be effected through a braking device that enables the operative power delivered to a differential to be passed to the opposite drive wheel in an unbalanced manner.

It is a further feature of this invention that the unbalanced delivery of operative power to opposing drive wheels can be accomplished through the driving of only one of the drive wheels to provide a side drive force that compensates for the side operating loads imposed by the rotating trenching tool.

It is still a further feature of this invention that the wheel adjacent to the side on which the rotating trenching tool is located is driven, while the wheel opposite to the rotating trenching tool is free-wheeling.

It is a further advantage of this invention that the single wheel drive adjacent the side loads imposed by the operating trenching tool provides a skewing force to the movement of the implement in opposition to that encountered with the trenching tool.

It is yet another advantage of this invention that the opposing skewing forces result in a forwardly moving trenching implement that is easy to control and has effective operation of the trenching tool.

It is yet another object of this invention to provide a trenching tool that can be easily constructed with different profiles to provide profiled trenches.

It is a further object of this invention to provide a walk behind edging/trenching implement having a side mounted ground engaging and shaping tool which is durable in construction, inexpensive of manufacture, carefree of maintenance, facile in assemblage, and simple and effective in use.

These and other objects, features and advantages are accomplished according to the instant invention by providing a walk-behind trenching implement having a side mounted rotary trenching tool for creating a profiled trench into the surface of the earth, which can also be used as an implement to edge landscape beds. The trenching implement is powered by an engine that delivers rotational power in an unbalanced manner to the wheel adjacent to the rotatable trenching tool. The wheel opposite to the trenching tool is can be non-powered to freely rotate as the implement is moved across the surface of the ground, or braked to unbalance power delivery through a differential. This unbalanced propulsion drive induces a skewing action into the operation of the implement that counterbalances the opposite skewing action resulting from the operation of the trenching tool to provide a more smoothly operating implement. A trenching tool having a configuration conducive to profile modification allows flexibility in the desired shape of the trench being formed.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Figure 1:
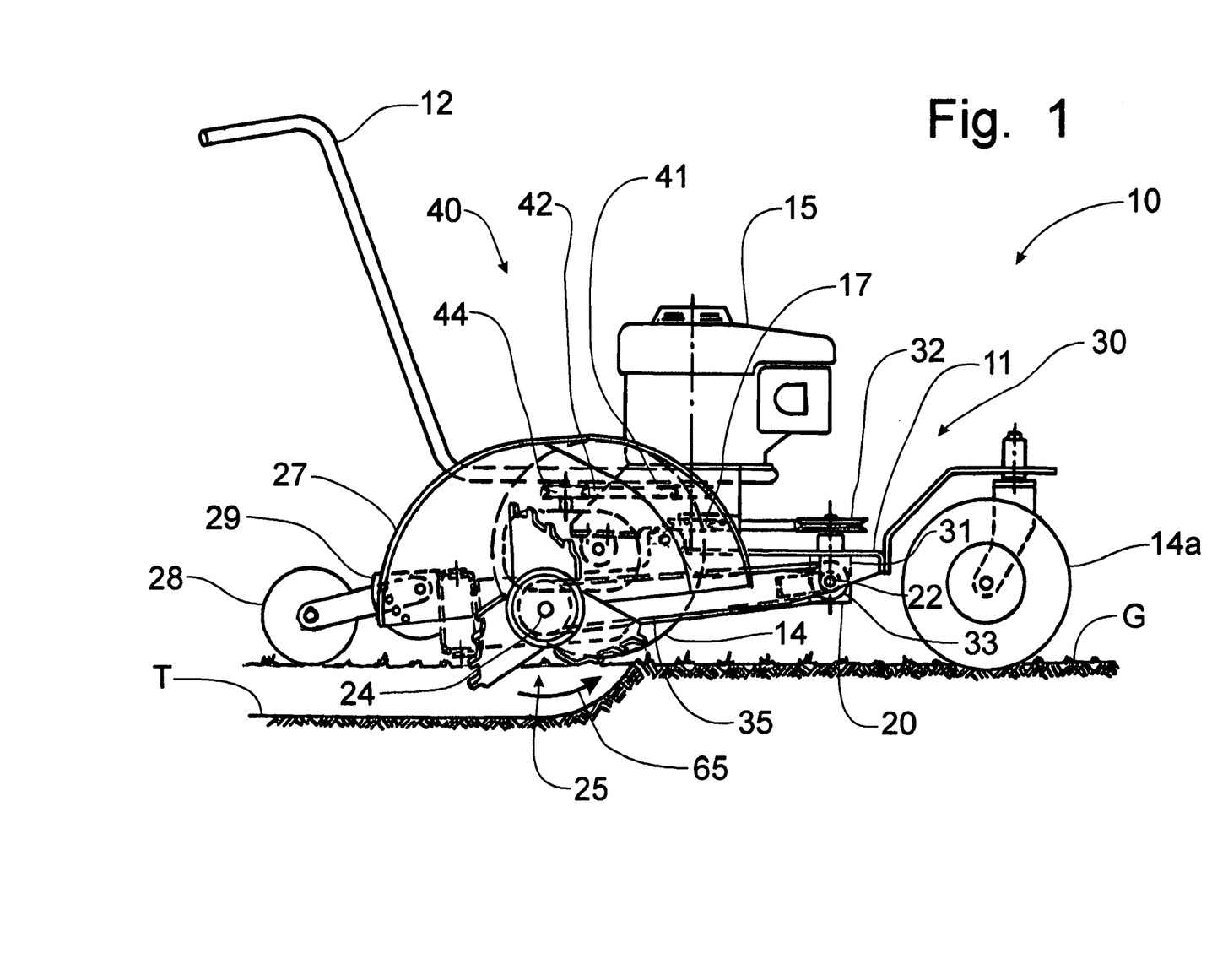
FIG. 1 is a right side elevational view of a walk-behind trenching implement incorporating the principles of the instant invention and having a side mounted trenching tool positioned for rotation adjacent the drive wheel of the implement.
Figure 2:
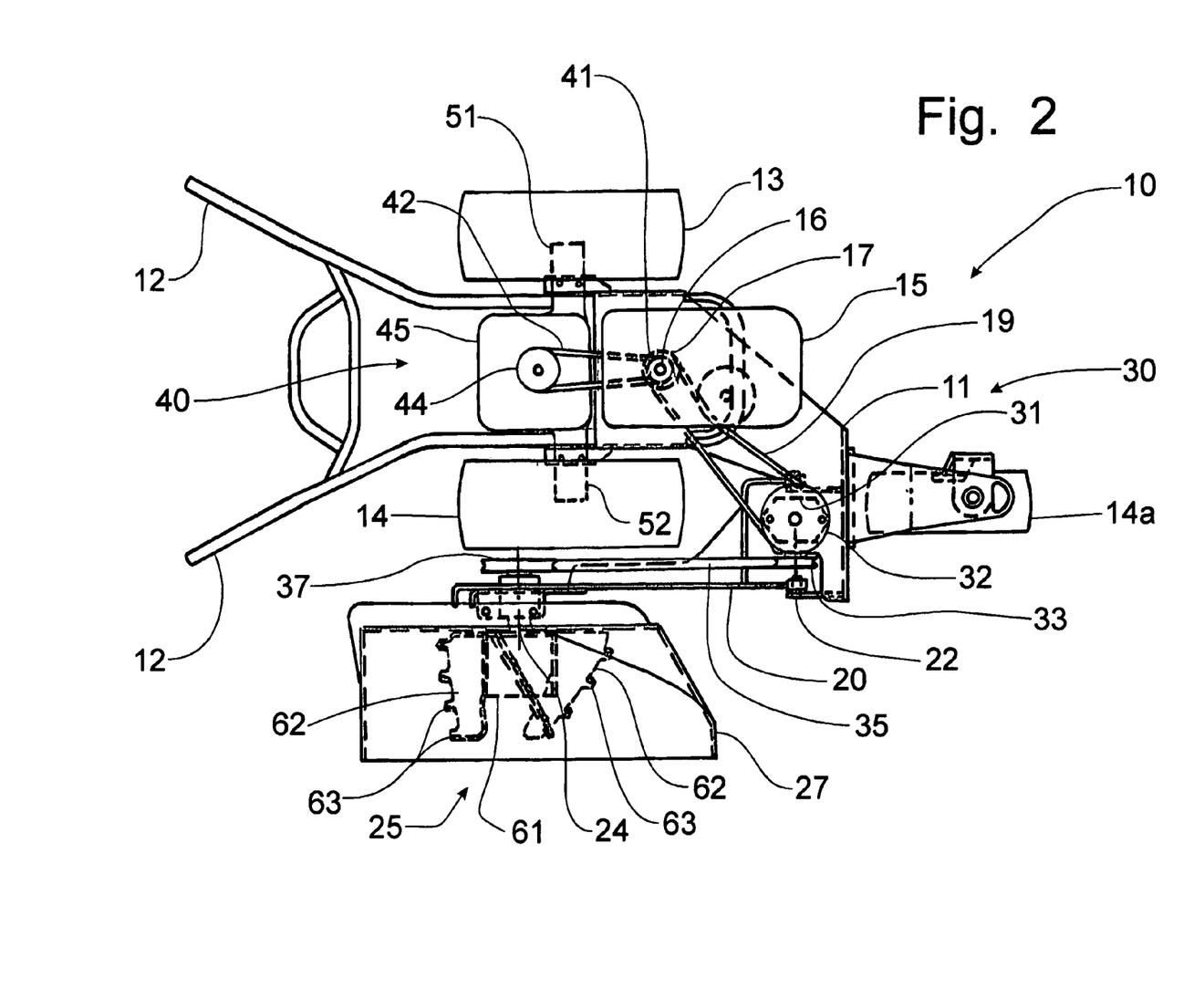
FIG. 2 is a top plan view of the trenching implement shown in FIG. 1.

Referring now to FIGS. 1 and 2, a walk-behind version of a landscape edging/trenching implement incorporating the principles of the instant invention can best be seen. Any left or right references are used as a matter of convenience and are determined by standing at the rear of the machine where the operator would walk gripping the handlebars to effect movement of the implement in a forward direction. One skilled in the art will readily recognize that the principles of the instant invention can be applied to self-propelled or mounted versions of powered implements as well as to walk-behind versions; however, only the walk-behind version, as depicted in the drawings, will be described to exemplify the inventions.

A edging/trenching implement 10 is known in the art for forming a small shaped trench in the surface of the ground to bury utility lines of various kinds, such as water, gas, electrical, communications cables, sewer lines and dog fencing, and to shape the edges of landscape beds. After the trench T has been dug and the utility line, etc. placed in the trench, the trench T is usually backfilled by hand or with a separate blade device. Side mounted edging/trenching implements 10, of the type depicted in the drawings, can also be used to shape landscape beds. The trenching tool 25 can be configured, as will be discussed in greater detail below, to provide the specific profile for the trench, against which mulch or other ground cover will be placed. Conventional landscape edgers operate somewhat similarly, though less aggressively and sometimes in the same rotational direction as the direction of travel, to maintain landscape beds after the landscape beds have been created.

Walk-behind implements 10 typically have a frame 11 supported above the ground G by a pair of wheels 13, 14 and an integral implement 40. An engine 15 providing the operative power for the edging/trenching implement 10 is supported on the frame 12. The engine 15 has a rotatably power output shaft 16 on which is typically mounted a pulley 17 to power a drive belt 19 for driving the trenching tool 25. The frame 11 extends rearwardly and upwardly to form a pair of laterally spaced handlebars 12 which the operator can grasp to control the operation and direction of travel of the implement 10. Typically, the handlebars 12 will have controls (not shown) supported thereon to control various aspects of the engine 15.

The two wheels 13, 14 provide only two points of contact for the implement 10 with the ground G. Although a pair of front wheels could be utilized to provide positional stability for the implement 10, a third wheel 14a is preferably mounted to the frame 11 at a forward location substantially in alignment with the drive wheel 14 because of the configuration of this edging/trenching implement 10 to place the trenching tool 25 on the side of the implement. This orientation of the front wheel 14a provides adequate stability for this particular edging/trenching implement 10 configuration. Preferably, the front wheel 14a is castered to permit the front wheel 14a to follow the direction of movement without interfering with steering or other operation of the implement 10.

The frame 11 supports on the right side a tool support arm 20 that is preferably pivoted at a horizontal pivot 22 mounted on the frame 11 to permit movement of the support arm 20 in a generally vertical direction, thus moving the trenching tool 25 into and out of engagement with the ground G. The tool support arm 20 extends rearwardly from the pivot 22 and terminates at a rotatable tool spindle 24 mounted in the support arm 20. The tool spindle 24 projects horizontally from the support arm 20 to mount the trenching tool 25, which will be described in greater detail below. A shroud 27 is also preferably mounted at the rearward terminus of the support arm 20 to surround the trenching tool 25 to control the discharge of dirt from the operation of the trenching tool 25. The rearward terminus of the tool support arm 20 can also have mounted thereon a gauge wheel 28 supported from an adjustable bracket 29 to control the depth to which the trenching tool 25 will dig into the ground G. By adjusting the position of the gauge wheel 28 relative to the bracket 29, the depth of the trench T formed by the trenching tool 25 can be varied.

The preferred drive mechanism 30 for the edging/trenching implement 10 is depicted in FIGS. 1–4. A first drive belt 19 is entrained around the drive pulley 17 to transfer rotational power from the engine power output shaft 16 to a driven pulley 32 on a right angle gearbox 31 supported on the frame 11 rearward of the front wheel 14a. Rotational power is transferred to an output pulley 33 oriented orthogonally to the driven pulley 32 on the outboard side of the gearbox 31. A second drive transfer belt 35 is entrained around the output pulley 33 and extends generally parallel to the tool support arm 20 to drive a tool spindle pulley 37, which in turn drives a spindle 24 that effects rotation of the trenching tool 25. Preferably, the pivot 22 is oriented in alignment with the axis of rotation of the output pulley 33 so that vertical movement of the tool support arm 20 does not change the tension in the second drive transfer belt 35.

Figure 3:
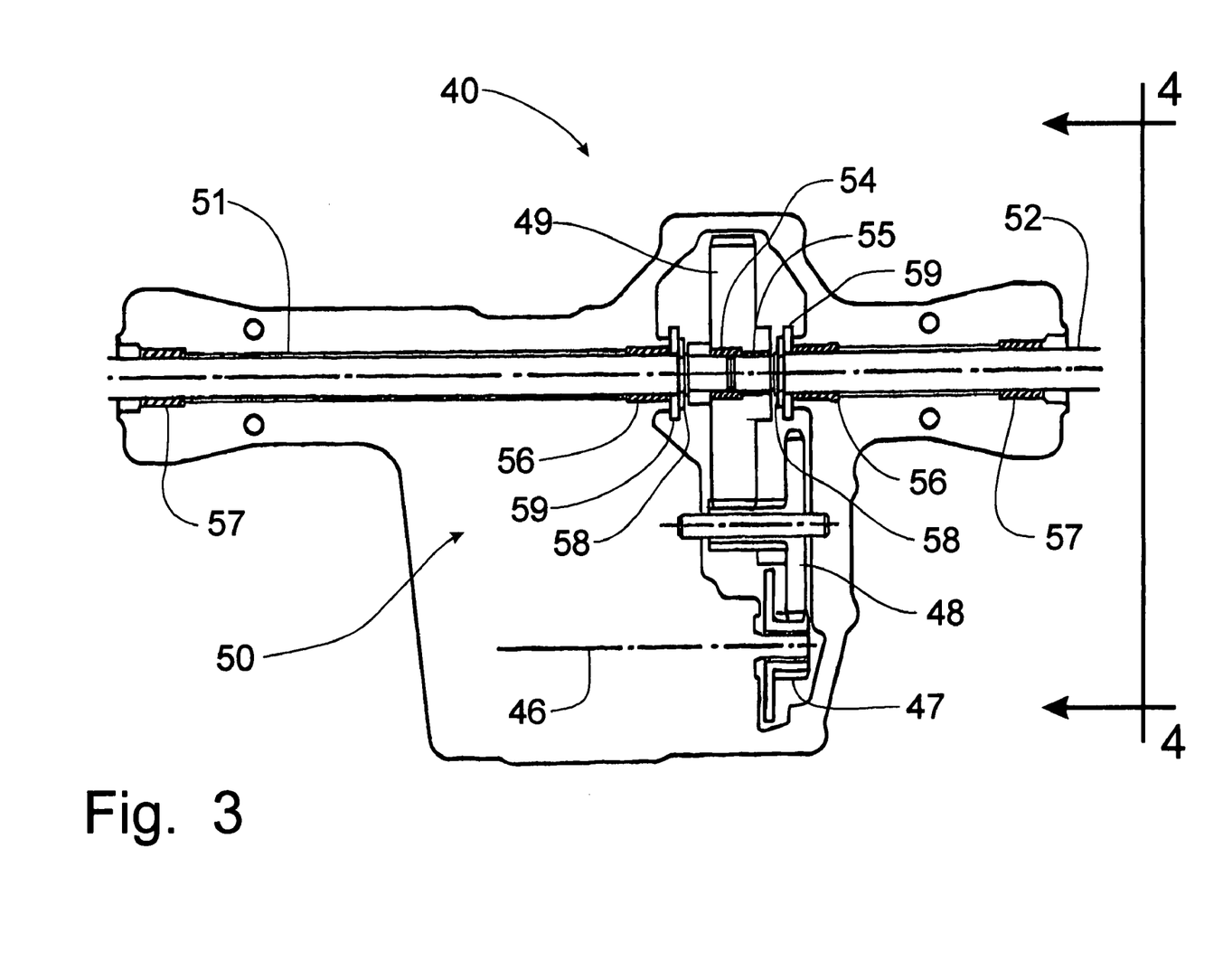
FIG. 3 is a schematic top plan view of the drive mechanism providing operative rotational power to a drive wheel on one side of the implement while allowing the opposing wheel to rotate freely.
Figure 4:
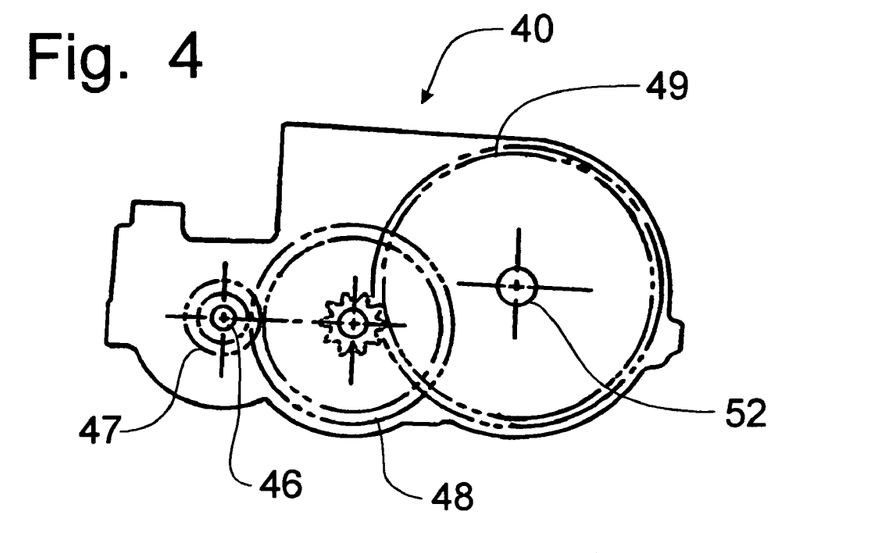
FIG. 4 is a right side elevational view of the drive mechanism corresponding to lines 4—4 of FIG. 3.

The propulsion drive mechanism 40 begins with a second drive pulley 41 supported on the power output shaft 16 of the engine 15, preferably above the first drive pulley 17 providing rotational power to the trenching tool 25. A third drive belt 42 is entrained around the second drive pulley 41 and around a trans drive pulley 44 to deliver rotational power to a hydrostatic transmission 45. One skilled in the art will recognize that other power transfer devices could be utilized, but a transmission mechanism enables the output speed to be varied by controls (not shown) on the handle bars 12 to control the operating speed of the implement 10. The hydrostatic transmission 45 has an output shaft 46 that is selectively variable in rotational speed. An output gear 47 is connected to the output shaft 46 to engage an intermediate step down gear 48 that, in turn, engages a drive gear 49 mounted on the axle mechanism 50 extending between the wheels 13, 14.

The axle mechanism 50 includes opposing first and second axles 51, 52 that extend from the drive gear 49 to the respective wheel 13, 14. The drive gear 49 is connected to the right axle 52 by a spline 55 to accomplish a driving connection therebetween, whereas a bushing 54 lies between the drive gear 49 and the left axle 51 to prevent the drive gear 49 from causing rotation of the left axle 51. The respective axles 51, 52 are supported by bearings 56, 57 retained by conventional snap rings 58 and washers 59. The drive gear 49 overlaps the intersection between the respective inboard ends of the axles 51, 52. With the use of the bushing 54, there is no driving connection between the drive gear 49 and the left axle 51, thus, the left axle is non-powered and, preferably, free wheeling to move with the movement of the implement 10. The splined connection between the drive gear 49 and the inboard end of the right axle 52 permits the transfer of rotational power to the right axle 52 to power the rotation of the right wheel 14 in response to the output power of the hydrostatic transmission 45.

Figure 5:
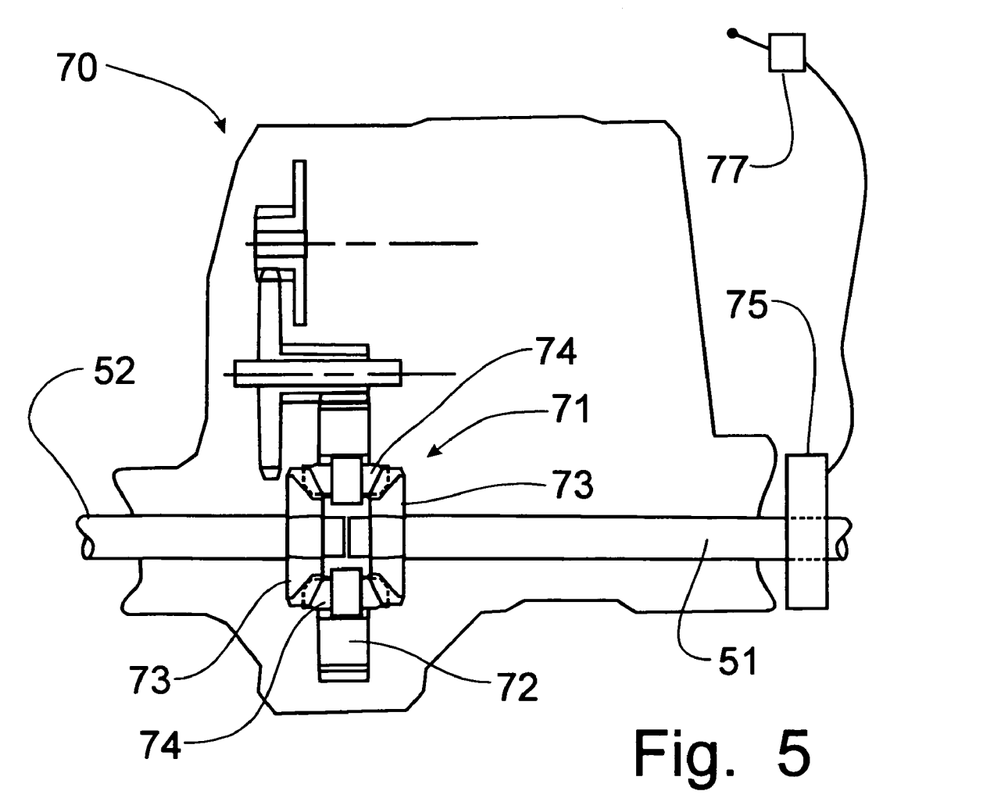
FIG. 5 is a schematic top plan view of an alternative drive mechanism providing an unbalanced delivery of operative rotational power to one of the drive wheels through a differential.

An alternative drive mechanism 70 is depicted in FIG. 5. In the preferred drive mechanism 30, no differential apparatus is provided between the power input, e.g. the drive pulley 17, and the axles 51, 52, thereby allowing one axle 52 to be powered while the opposing axle 51 is left unpowered. In the alternative drive mechanism 70, a conventional differential apparatus 71 is retained within the drive mechanism 70, wherein a primary ring gear 72 is driven from the engine 15 to rotate pinions 73 fixed to the respective axles 51, 52 through planetary gears 74 in a conventional manner. The drive mechanism 70 further includes a braking device 75 operatively mounted on the left axle 51, preferably between the axle 51 and the corresponding ground engaging wheel 13. As a result, the differential apparatus 71 will transfer rotational power to the right ground-engaging wheel 14 to create an unbalanced drive offsetting the drag imposed by the operation of the rotating trenching tool 25.

In operation, the alternative drive mechanism 70 is controlled through manipulation of a control device 77 mounted on the handlebars 12. The control device 77 engages the brake 75 to restrict the rotation of the ground-engaging wheel 13, thus restricting the rotation of the corresponding pinion 73. As a result, the rotation of the planetary gears 74 with the ring gear 72 drives the opposite axle 52 and the corresponding ground-engaging wheel 14 at a faster speed to impose an unbalanced drive to the wheels 13, 14 and offsetting the drag imposed by the rotating trenching tool 25. The manipulation of the control 77 can be varied to provide an offsetting skew to the implement 10 that matches the drag imposed by the trenching tool 25, which can vary according to the characteristics of the soil being engaged and the shape and depth of penetration of the tool 25. Alternatively, the control 77 could be interlocked with the engagement of the drive to the trenching tool 25 so that the implement 10 would be driven in a balanced manner when the trenching tool 25 is disengaged and in an unbalanced mode when the trenching tool 25 is engaged.

Yet another alternative drive mechanism could include the locking of the rotation of the opposite drive shaft 51 and a selective disengagement of the corresponding ground-engaging wheel 13 to permit the opposite wheel 13 to freewheel in response to the engagement of the drive to the trenching tool 25. In this configuration, the differential mechanism 71 would deliver all rotational power from the engine 15 to the ground-engaging wheel 14 adjacent to the trenching tool 25. Such a drive arrangement would involve mechanical interlocks that may not present a financially practical design. Nevertheless, alternative unbalanced drive configurations can be encompassed within the scope of the instant invention to offset the side drag forces imposed through the operation of the rotating trenching tool 25.

The trenching tool 25 is configured to carve a trench T into the surface of the ground G along side of the implement 10. The trenching tool 25 is formed from a central cup 62 preferably having a closed end detachably connected to the tool spindle 24 to be rotatably driven thereby from the entrained second drive transfer belt 35. A series of cutting blades 62 are mounted around the circumference of the central cup 61 preferably in a spiral orientation to spread out the forces generated from the cutting blades 62 engaging the ground G. The cutting blades 62 are formed with cutting teeth 63 located along the outer periphery of the blades 62. The shape of the cutting blades 62 will define the shape of the trench T to be created by the rotation of the trenching tool 25. Accordingly, differently configured cutting blades 25 can be substituted to create the desired shape of the trench T to be dug, simply by detaching the central cup 61 from the spindle 24 and re-attaching a preferred trenching tool 25 having the desired configuration. The trenching tool 25 is rotated in the direction indicated by the rotation arrow 65, which looking at the right side of the implement 10, as seen in FIG. 1, is in a counterclockwise direction with the digging motion of the trenching tool 25 in the ground G is in the same direction as the normal direction of travel of the implement 10.

In operation, the propulsion drive mechanism 40 delivers rotational power from the engine 15 through the hydrostatic transmission 45 to the right wheel 14 to drive only the right wheel 14 without providing rotational power to the left wheel 13. This one-sided driving power to the implement 10 causes a skewing of the implement to the left since the left wheel 13 is freely rotating without being driven from the engine 15. In opposition to the skewing forces on the implement 10 from the propulsion drive mechanism 40, the operation of the trenching tool 25 digging into the ground G pulls the implement 10 to the right. The net result of the opposing skewing forces is that the implement 10 is propelled substantially straight forwardly without undue physical exertion from the operator. The movement of the implement 10 without the trenching tool 25 being engaged with the ground G, however, requires the operator to physically compensate for the skewing forces exerted by the propulsion drive mechanism 40.

To form a trench T in the ground G, the operator lowers the tool support arm 20 until the trenching tool 25 engages the surface of the ground G. The operative power to the trenching tool 25 is engaged to start the rotation of the trenching tool 25 which will then dig into the ground G until a limit device such as the gauge wheel 28 stops the lowering of the tool support arm 20. In this manner, the trenching tool 25 will dig a profiled trench T in the ground G extending parallel to the direction of travel over which the implement 10 is steered. Control over the position of the trench T is maintained by the operator directing the movement of the implement 10 through manipulation of the handle bars 12. The earth excavated by the trenching tool 25 is thrown forwardly and upwardly into the shroud 27 which is shaped to deflect the excavated earth outboard of the freshly dug trench T. For new landscape beds, the trench T is formed with a sharp profile with the excavated earth being thrown onto the new landscape bed, rather than onto the area (such as the lawn) over which the implement 10 is being operated.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An implement for forming a trench into the surface of the ground comprising:
    a frame supported by a pair of ground-engaging wheels and at least a third support member to provide positional stability for said frame to move over the surface of the ground;
    a trenching apparatus mounted on said frame and being positioned outboard of said ground-engaging wheels, said trenching apparatus being selectively operable to engage the ground to form a trench therein;
    a power apparatus operatively connected to said trenching apparatus to provide operative power thereto; and
    a drive mechanism operatively connected to said power apparatus to transfer rotational power in an unbalanced distribution to said ground-engaging wheels continuously while said trenching apparatus is operatively engaged with the ground.

2. The implement of claim 1 wherein said drive mechanism includes:
    a differential mechanism transferring operative power to said ground-engaging wheels; and
    a braking device operatively associated with one of said ground-engaging wheels to restrict rotation thereof during movement of said implement over the ground, whereby said differential mechanism will transfer more operative power to the other of said ground-engaging wheels to provide said unbalanced distribution of operative power.

3. The implement of claim 2 wherein said braking device is selectively engagable through manipulation of a control apparatus.

4. The implement of claim 3 wherein said implement has a walk-behind configuration, including handlebars for engagement by an operator, said control apparatus being mounted on said handlebars.

5. The implement of claim 3 wherein said braking device is engaged in response to the operation of said trenching apparatus.

6. The implement of claim 1 wherein said drive mechanism is operable to deliver operative power to only the one of said ground-engaging wheels adjacent said trenching apparatus.

7. The implement of claim 6 wherein said drive mechanism comprises:
    a drive member connected to a rotatable output shaft of said power apparatus; and
    a driven member operatively powered in rotation from said drive member and being mounted on an axle assembly interconnecting said ground engaging-wheels.

8. The implement of claim 7 wherein said axle assembly includes first and second axle members connected respectively to said ground-engaging wheels, said driven member being affixed to said first axle member which is connected to said one of said ground-engaging wheels.

9. The implement of claim 8 wherein said driven member is mounted on both said first and second axle members, a bushing being positioned between said driven member and said second axle member to permit said second axle member to rotate independently of said driven member.

10. The implement of claim 6 wherein said control apparatus is a handlebar connected to said frame for manipulation by an operator of said trenching member to control a direction of travel for said trenching implement, permitting said operator to walk behind said trenching implement while effecting operation thereof.

11. The implement of claim 10 wherein said trenching apparatus comprises:
    a longitudinally extending support arm pivotally connected to said frame forwardly of said ground-engaging wheels;
    a trenching tool rotatably mounted on a rearward end of said support arm for engagement with the ground to form a trench therein upon rotation of said trenching tool; and
    a power transfer mechanism supported on said support arm and operatively interconnecting said trenching tool and said power apparatus to cause operative rotation of said trenching tool.

12. The implement of claim 11 wherein said trenching tool is detachably mounted on a spindle rotatably positioned at the rearward end of said support arm.

13. In a trenching implement having a frame supported by a pair of ground-engaging wheels and at least a third support member for forward movement over the ground; an engine supported on said frame; and a trenching apparatus for digging a trench into the ground, said trenching apparatus being positioned outboard to one side of said frame and being connected to said engine by a power transfer mechanism that transfers operational power from said engine to said trenching apparatus, the improvement comprising:
    a drive mechanism operatively connected said engine to receive rotational power therefrom and to effect an unbalanced distribution of said motive rotational power to said ground-engaging wheels to continuously create during the operation of said trenching apparatus a side skew to the forward movement of said implement that offsets a side drag imposed by the operation of said trenching apparatus.

14. The trenching implement of claim 13 wherein said drive mechanism is operable to distribute motive rotational power to only one of said ground-engaging wheels, the other of said ground-engaging wheels being in a non-powered state.

15. The trenching implement of claim 14 wherein said drive mechanism comprises:
   a drive member connected to a rotatable output shaft of said engine; and
   a driven member operatively powered in rotation from said drive member and being mounted on an axle assembly interconnecting said ground engaging-wheels.

16. The trenching implement of claim 15 wherein said frame includes a handlebar connected to said frame for manipulation by an operator of said trenching member to walk behind said trenching implement while controlling a direction of travel for said trenching implement.

17. The trenching implement of claim 15 wherein said one ground-engaging wheel is adjacent said trenching apparatus, said other ground engaging wheel being located on the opposing side of said frame from said trenching apparatus.

18. The trenching implement of claim 17 wherein said axle assembly includes first and second axle members connected respectively to said one ground-engaging wheel and to said other ground-engaging wheel, said driven member being mounted on both said first and second axle members, said driven member being affixed to said first axle member, a bushing being located between said driven member and said axle member to permit said second axle member to rotate independently of said driven member.

19. The trenching implement of claim 18 wherein said trenching apparatus comprises:
   a longitudinally extending support arm pivotally connected to said frame forwardly of said ground-engaging wheels, said support arm including a spindle rotatably positioned at a rearward end of said support arm;
   a trenching tool rotatably, detachably mounted on said spindle for engagement with the ground to form a trench therein upon rotation of said trenching tool; and
   said power transfer mechanism being supported on said support arm and operatively interconnecting said trenching tool and said engine to cause operative rotation of said trenching tool.

20. The trenching implement of claim 13 wherein said drive mechanism includes:
   a differential mechanism transferring operative power from said engine to said ground-engaging wheels; and
   a braking device operatively associated with one of said ground-engaging wheels to restrict rotation thereof during movement of said implement over the ground, whereby said differential mechanism will transfer more operative power to the other of said ground-engaging wheels to provide said unbalanced distribution of operative power.

21. The trenching implement of claim 20 wherein said braking device is selectively engagable through manipulation of a control apparatus.

22. The trenching implement of claim 21 wherein said braking device is operable to vary the extent of restriction of rotation of said one ground-engaging wheel, thereby varying the extent of unbalanced operative power distributed to said other ground-engaging wheel.

23. An edging/trenching implement comprising:
   a frame supported by a pair of transversely spaced ground-engaging wheels and at least a third support member, said frame including a rearwardly directed handlebars for engagement by an operator to control a direction of travel for said edging/trenching implement, said control apparatus permitting said operator to walk behind said edging/trenching implement while effecting operation thereof;
   an engine supported on said frame to provide operational power for said edging/trenching implement;
   a longitudinally extending support arm pivotally connected to said frame forwardly of said ground-engaging wheels, said support arm including a spindle rotatably positioned at a rearward end of said support arm;
   a tool detachably mounted on said spindle for rotational engagement with the ground to form a trench therein upon rotation of said tool; and
   a power transfer mechanism being supported on said support arm and operatively interconnecting said tool and said engine to cause operative rotation of said tool; and
   a drive mechanism operatively connected said engine to receive rotational power therefrom and being operable to distribute continuously during the operation of said tool while forming said trench more motive rotational power to the ground-engaging wheel adjacent to said tool than to said ground-engaging wheel on an opposing side of said frame from said tool.

24. The edging/trenching implement of claim 23 wherein said drive mechanism is operable to transfer motive rotational power to only one of said ground-engaging wheels, the other of said ground-engaging wheels being in a free-wheeling, non-powered state while the opposing one ground-engaging wheel is being operatively powered.

25. The edging/trenching implement of claim 24 wherein said trenching tool comprises:
   a central cup member detachably connected to said spindle for rotation therewith, said cup member defining an outer periphery having a greater diameter than said spindle; and
   a plurality of cutting blades mounted on the outer periphery of said cup member.

26. The edging/trenching implement of claim 25 wherein said cutting blades are mounted in a spiraled manner around said periphery of said cup member, the orientation of said cutting blades throwing excavated soil from said ground outboard and away from said trenching implement.

27. The edging/trenching implement of claim 23 wherein said drive mechanism includes:
   a differential mechanism transferring operative power from said engine to said ground-engaging wheels; and
   a braking device operatively associated with said other of said ground-engaging wheels to restrict rotation thereof during movement of said implement over the ground, whereby said differential mechanism will transfer more operative power said one ground-engaging wheel to provide an unbalanced distribution of operative power.

28. A method of forming a trench in the surface of the ground, comprising the steps of:
   rotating a trenching tool outboard to one side of a trenching implement;
   effecting an unbalanced distribution of motive operative power to transversely opposing ground-engaging wheels of said trenching implement, thus creating a continuous skewing movement in a first side direction as said trenching implement is moving forwardly; and lowering said trenching tool into the engagement with the surface of the ground to create a skewing movement in a second direction opposite to said one side direction, said skewing movement in said first side direction generally offsetting said skewing movement in said second direction to permit said trenching tool to be guided in a generally straight direction.

29. The method of claim 28 wherein said effecting step includes the step of:

driving one of said ground-engaging wheels while leaving an opposing ground-engaging wheel in a non-powered state, thus creating said skewing movement in a first side direction as said one ground-engaging wheel is rotatably driving said trenching implement forwardly.

30. The method of claim 28 wherein said effecting step includes the step of:

providing a differential apparatus delivering said motive operative power to said transversely opposing ground-engaging wheels;

braking said other of said ground-engaging wheels to restrict rotation thereof; and distributing a disproportionately larger share of said motive operative power through said differential apparatus to said one of said ground-engaging wheels to create said skewing movement in a first side direction.

31. The method of claim 30 wherein said braking step is selectively and variably applied to said other of said ground-engaging wheels to vary said skewing movement in a first direction so as to match substantially said skewing movement is a second direction.

* * * * *